(No Model.) 10 Sheets—Sheet 1.

J. OWEN.
APPARATUS FOR RECEIVING PAYMENT AND DELIVERING VALUE IN EXCHANGE THEREFOR.

No. 428,514. Patented May 20, 1890.

(No Model.) 10 Sheets—Sheet 2.
J. OWEN.
APPARATUS FOR RECEIVING PAYMENT AND DELIVERING VALUE IN EXCHANGE THEREFOR.

No. 428,514. Patented May 20, 1890.

(No Model.) 10 Sheets—Sheet 3.

J. OWEN.
APPARATUS FOR RECEIVING PAYMENT AND DELIVERING VALUE IN EXCHANGE THEREFOR.

No. 428,514. Patented May 20, 1890.

(No Model.)　　　　　　　　　　　10 Sheets—Sheet 5.
J. OWEN.
APPARATUS FOR RECEIVING PAYMENT AND DELIVERING VALUE IN EXCHANGE THEREFOR.

No. 428,514.　　　　　　　Patented May 20, 1890.

(No Model.)   10 Sheets—Sheet 6.
J. OWEN.
APPARATUS FOR RECEIVING PAYMENT AND DELIVERING VALUE IN EXCHANGE THEREFOR.
No. 428,514.   Patented May 20, 1890.

(No Model.) 10 Sheets—Sheet 7.
J. OWEN.
APPARATUS FOR RECEIVING PAYMENT AND DELIVERING VALUE IN EXCHANGE THEREFOR.
No. 428,514. Patented May 20, 1890.

(No Model.) 10 Sheets—Sheet 9.

J. OWEN.
APPARATUS FOR RECEIVING PAYMENT AND DELIVERING VALUE IN EXCHANGE THEREFOR.

No. 428,514. Patented May 20, 1890.

(No Model.) 10 Sheets—Sheet 10.
J. OWEN.
APPARATUS FOR RECEIVING PAYMENT AND DELIVERING VALUE IN EXCHANGE THEREFOR.

No. 428,514. Patented May 20, 1890.

UNITED STATES PATENT OFFICE.

JOSEPH OWEN, OF LIVERPOOL, ENGLAND, ASSIGNOR TO ROBERT WIL-
LOUGHBY VINING, OF SAME PLACE.

APPARATUS FOR RECEIVING PAYMENT AND DELIVERING VALUE IN EXCHANGE THEREFOR.

SPECIFICATION forming part of Letters Patent No. 428,514, dated May 20, 1890.

Application filed November 19, 1889. Serial No. 330,906. (No model.) Patented in England June 6, 1888, No. 8,274.

*To all whom it may concern:*

Be it known that I, JOSEPH OWEN, mechanical engineer, a subject of the Queen of Great Britain, and a resident of Liverpool, England, have invented certain new and useful Improvements in Apparatus for Receiving Payment and Delivering Value in Exchange therefor, (for which I have obtained a patent in Great Britain, No. 8,274, bearing date June 6, 1888,) of which the following is a specification, reference being had to the accompanying drawings.

My invention relates to apparatus for receiving payments and delivering value in exchange therefor.

My said invention comprises various novel features hereinafter set forth.

In the accompanying drawings I have shown how my said invention may be conveniently and advantageously carried into practice.

Figure 1:
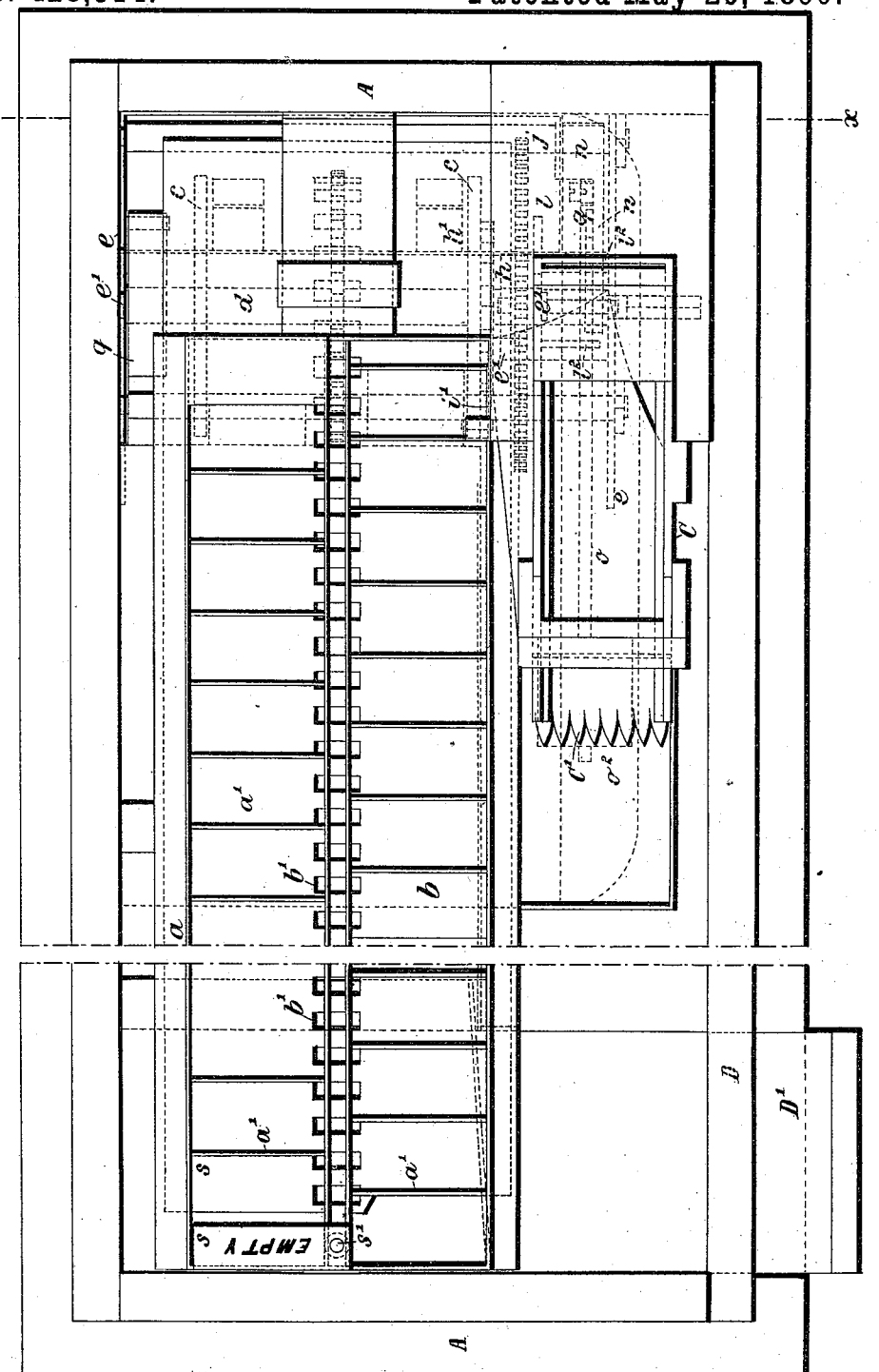
Figure 2:
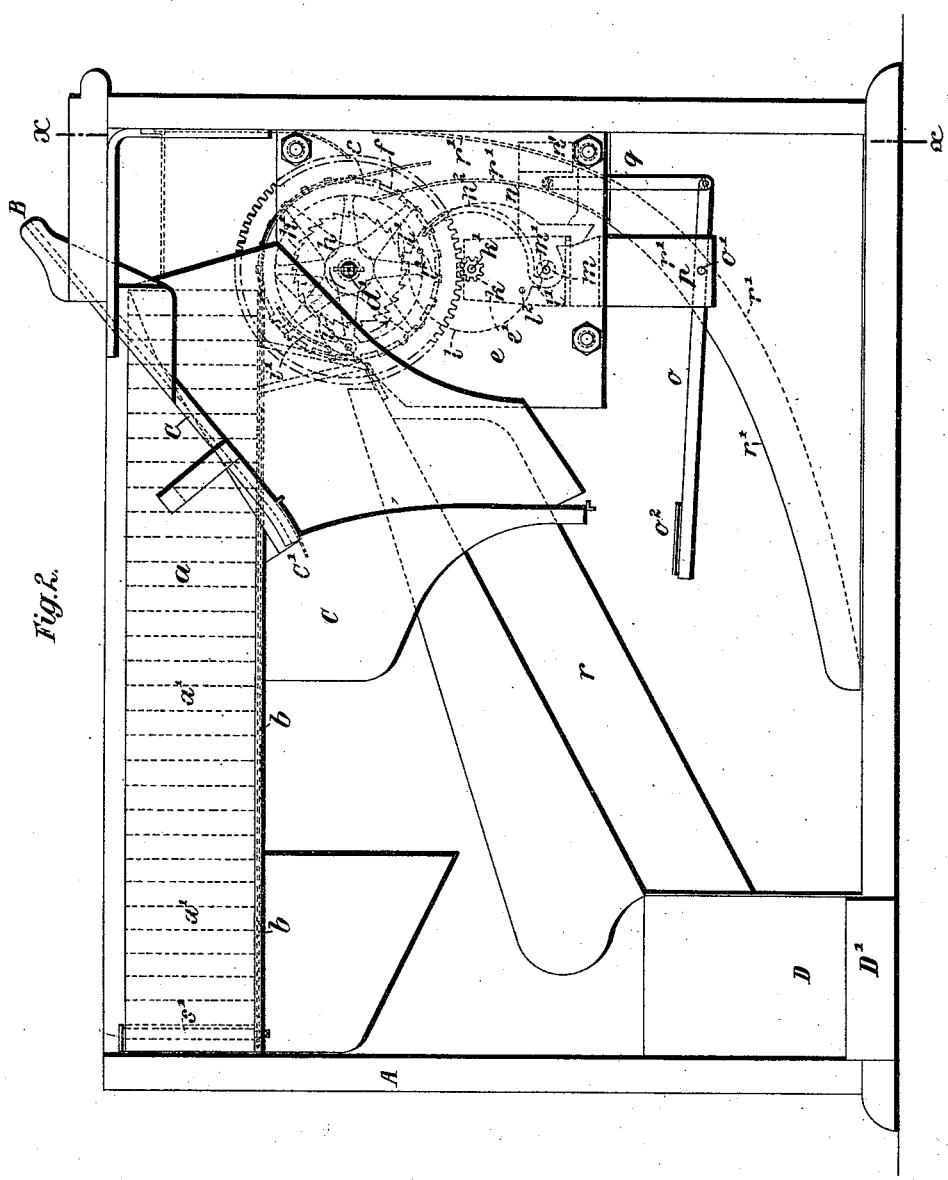
Figure 3:
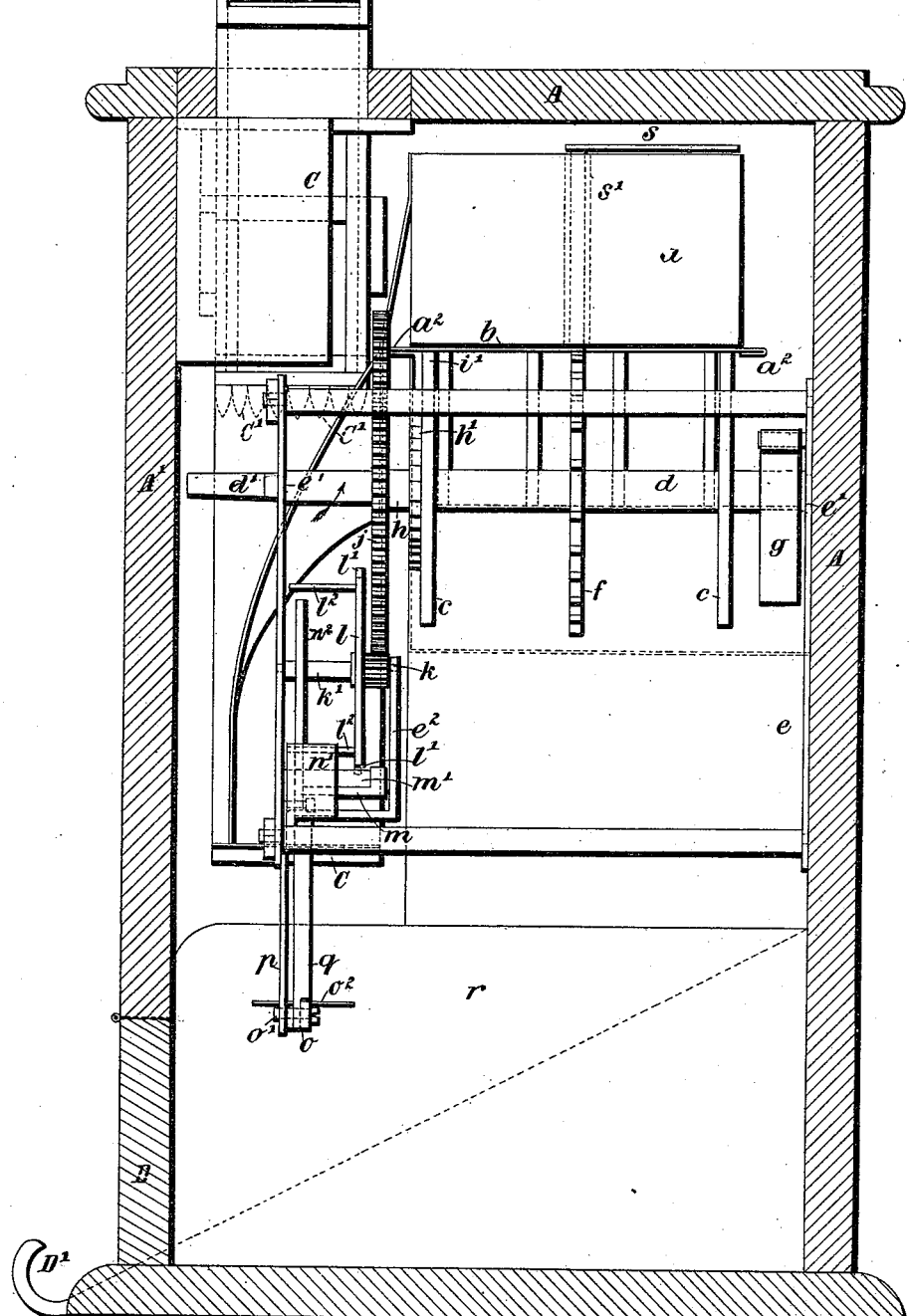
Figure 4:
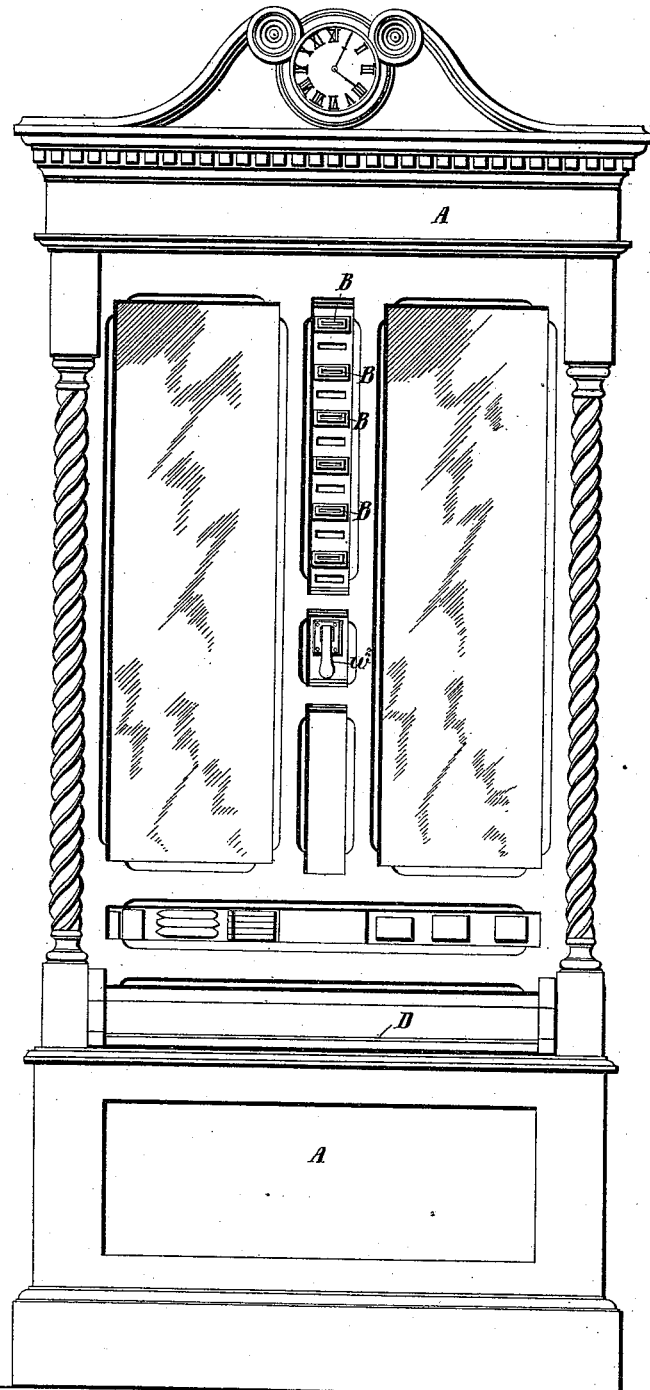
Figure 5:
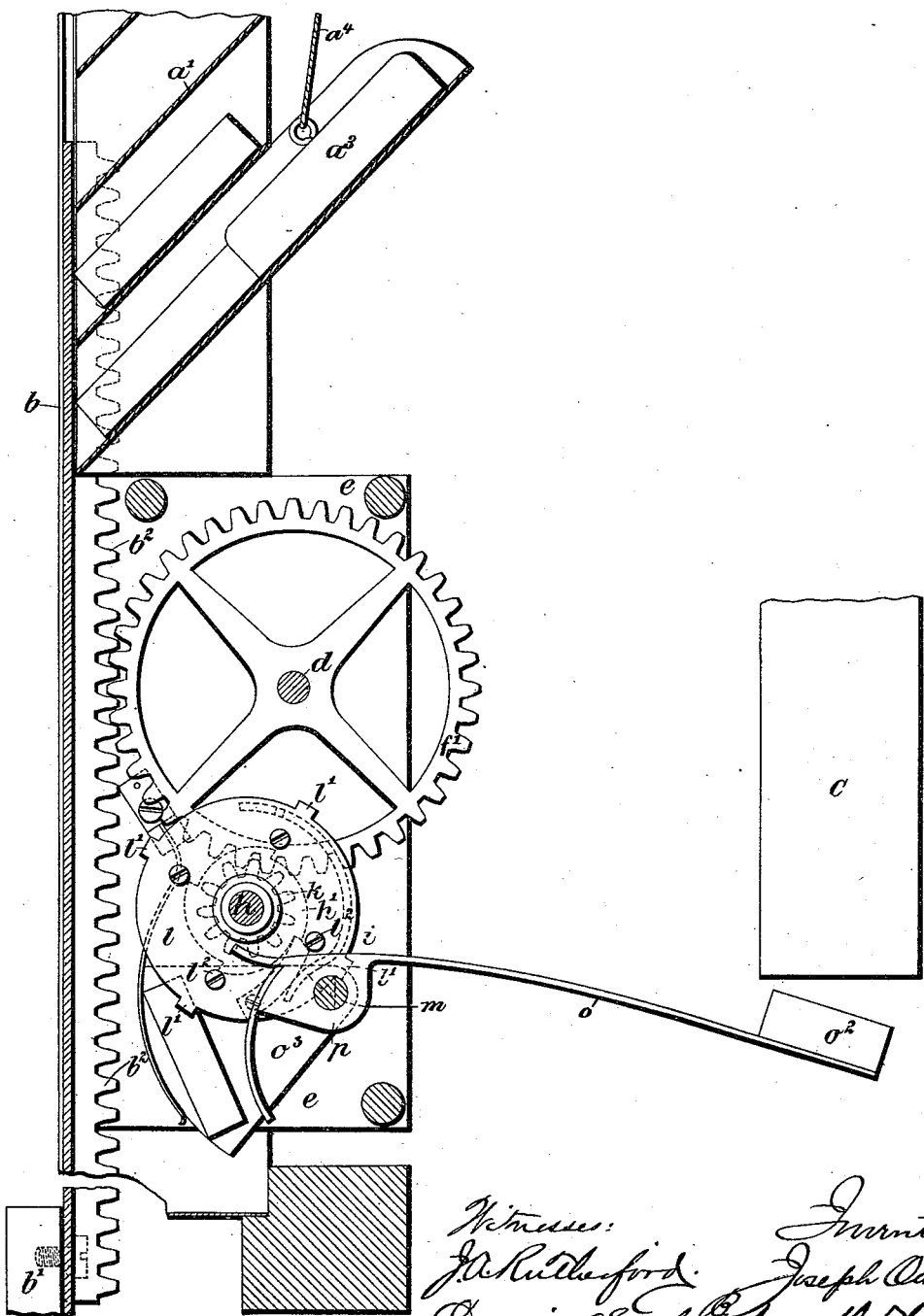
Figure 9:
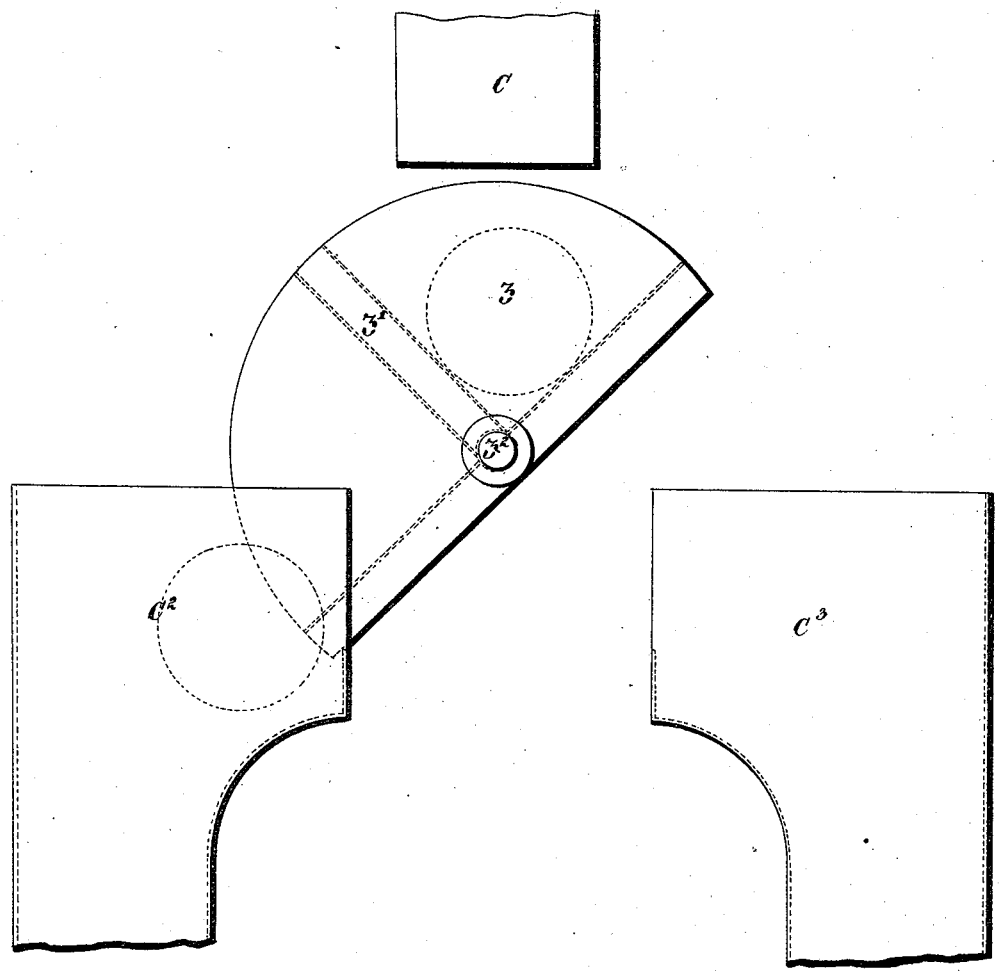
Figure 11:
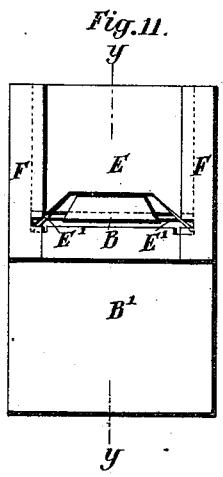
Figure 12:
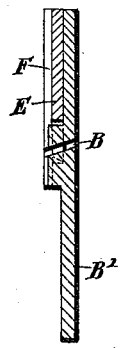
Figure 10:
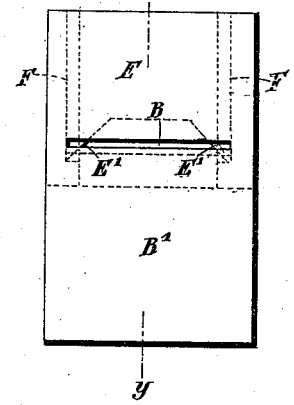

Figure 1 is a plan of one form of my improved apparatus, the upper part of the box or case being removed. Fig. 2 is a front elevation of the said apparatus, the front part of the box or case being removed; and Fig. 3 is a transverse section on the line $x\ x$, Figs. 1 and 2, some parts being removed. Fig. 4 is a front elevation. Fig. 5 is a vertical central section, and Fig. 6 a rear elevation, of a portion of Fig. 4, showing another form or modification of the said apparatus, some of the parts being removed. Fig. 7 is a vertical central section, and Fig. 8 a rear elevation, showing my chute-clearing device, hereinafter described. Fig. 9 is a rear elevation showing an improved coin-chute switch, hereinafter described. Figs. 5 to 9 are drawn to an enlarged scale. Fig. 10 is a front elevation, Fig. 11 is a rear elevation, and Fig. 12 is a vertical section on the line $y\ y$, Figs. 10 and 11, illustrating an improved fraud-preventing device, hereinafter described.

Like letters indicate corresponding parts throughout the drawings.

A is the box or case.

B is the slot or slit for the insertion of the coin or coins into the apparatus.

C is the coin-chute.

D is the aperture through which the articles are delivered from the apparatus.

$a$ is a hopper, which is divided by suitable partitions $a'$ into compartments, in which the articles intended to be delivered are placed. The size and shape of the said compartments are arranged to suit the dimensions of the said articles.

In the apparatus shown in Figs. 1 to 3 the hopper $a$ is horizontal, and the bottom of the said hopper is closed when the hopper is full by a flexible band or shutter $b$, running in suitable grooves $a^2$, provided in the said hopper. The hopper $a$ is open at the top, so that the compartments can be filled when desired. I prefer to construct the hopper $a$ double—that is to say, with two rows of compartments placed parallel to each other. Any number of these double hoppers may be arranged in one box or case, although for convenience only one of the said double hoppers is shown in the drawings. The compartments are preferably constructed so that the partitions $a'$, which form the said compartments in one row, are placed centrally with respect to the compartments in the other row, the flexible band or shutter $b$ closing the lower extremities of both the rows of compartments in the double hopper. The said flexible band or shutter $b$ is arranged to be wound upon two or more wheels or pulleys $c$, fixed upon a shaft or spindle $d$, carried in suitable bearings $e'$ in a frame $e$, fixed in the box or case A at one end thereof. The spindle $d$ is, moreover, provided with a toothed wheel $f$, the teeth of which are adapted to engage in holes $b'$ in the flexible band or shutter $b$. To the said shaft or spindle $d$ is attached one extremity of a flat or ribbon spring $g$, such as is ordinarily employed in clockwork mechanism. The other extremity of the said spring $g$ is attached to the frame carrying the said shaft or spindle $d$. To permit the winding up of the spring $g$, I provide upon the said shaft or spindle $d$ a sleeve $h$, having fixed thereon a ratchet-wheel $h'$, with which engages a pawl $i$. The pawl $i$ is pivoted to one of the wheels or pulleys $c$, carrying the flexible band or shutter $b$, and is provided with a suitable spring $i$ to insure its engaging with the teeth of the ratchet-wheel $h'$.

$j$ is a toothed wheel firmly secured to the said sleeve $h$. The toothed wheel $j$ gears with a pinion $k$, fixed on a shaft or spindle $k'$, one extremity of which is carried in a suitable bearing in the frame $e$ and the other extremity in a bracket $e^2$ attached thereto. Upon the shaft or spindle $k'$ is also secured a disk $l$, having two or any other suitable number of projections or teeth $l'$, which are adapted to alternately engage with a shaft or spindle $m$, also supported in the frame $e$ and bracket $e^2$. The shaft or spindle $m$ is, moreover, provided with a flat or cut-away portion $m'$, which, when the said shaft or spindle $m$ is partially rotated alternately in either direction, acts as an escapement to permit the passage of the projections or teeth $l'$.

$n$ is an arm or lever, one extremity of which is fixed upon the shaft or spindle $m$, and the other extremity of which is provided with a suitable counter-weight $n'$.

$o$ is another lever pivoted at $o'$ to a bracket $p$, attached to or forming part of the frame $e$. The short arm of the lever $o$ is coupled by means of a connecting-rod $q$ to the arm or lever $n$, and an enlargement or receptacle $o^2$, provided upon the extremity of the long arm of the said lever $o$, extends beneath the chute C for the coin or coins inserted into the apparatus through the coin slit or aperture B. The disk $l$ is, moreover, provided with pins or projections $l^2$, with one of which alternately engages an upwardly-curved arm $n^2$ of the said arm or lever $n$ when the apparatus is operated so as to release the projection $l'$, thus preventing the said disk $l$ from making more than half a revolution at each operation by retaining the said disk in position until the flat or cut-away portion $m'$ upon the shaft or spindle $m$ has resumed its normal position, so that the said shaft or spindle $m$ again engages with one of the projections or teeth $l'$ upon the disk $l$.

One extremity of the main shaft or spindle $d$ is extended through the frame and is provided with a suitable square portion $d'$, upon which a suitable key can be placed for turning the said spindle and winding up the spring.

When the main shaft or spindle $d$ is turned in the direction indicated by the arrow in Figs. 2 and 3, so as to wind up the spring $g$, the flexible band or shutter is moved by the toothed wheel $f$, so as to close the lower extremities of the compartments of the hopper $a$, and when all the lower extremities of the compartments are closed by the said flexible band or shutter $b$ the clock-work spring hereinbefore described is fully wound up. Beneath the said hopper $a$ is a chute $r$, leading to the aperture D in the box or case A, in which is fixed a tray $D'$, from which the articles delivered from the apparatus can be easily removed by hand.

$r'$ are guides to direct the course of the flexible band or shutter $b$.

$s$ is a plate bearing upon its upper surface the word "Empty." The plate $s$ is attached by means of a rod $s'$ or otherwise to the said flexible band or shutter $b$, so as to travel with the latter.

To prevent fraud, I so construct the coin-chute C that if a coin of an improper size be introduced into the coin slit or aperture B it will pass through the said chute C and will not operate the mechanism, as will be hereinafter described. To prevent the insertion of a coin or disk of the right size having a string or wire attached to the same, I provide at the lower extremity of the coin-chute C teeth $C'$, adapted to engage with the said string or wire. The box or case A is, moreover, provided with a convenient door or doors $A'$.

The operation of the apparatus above described is as follows—that is to say, if a coin of the proper size be introduced into the coin slit or aperture B it passes down the coin-chute C, and falling upon the enlargement $o^2$ upon the extremity of the arm or lever $o$ partially rotates the spindle $m$, so as to permit the tooth $l'$ to pass over the flat or cut-away portion $m'$, thus releasing the mechanism and allowing the disk $l$ to be acted upon by the spring $g$ through the shaft or spindle $d$, ratchet-wheel $h'$, toothed wheel $j$, and pinion $k$, so as to make half a revolution, thereby moving the flexible band or shutter $b$ a predetermined distance by means of the toothed wheel $f$ and allowing the article contained in one of the compartments of the hopper $a$ to fall from the same. The said article then passes down the chute $r$ beneath the said compartments through the aperture D and falls into the tray $D'$, from which it can be conveniently removed by hand. To fill the compartments in the hopper $a$, the main spindle $d$ is turned and the spring $g$ wound by means of a key placed upon the square $d'$, provided upon the extremity of the said spindle, until the flexible band or shutter $b$ is in the desired position beneath the compartments of the hopper.

By arranging the compartments in the hopper $a$ in the manner shown the articles are delivered alternately from either of the rows of compartments, the flexible band or shutter $b$ alternately leaving the lower extremities of the said compartments open and half-open at each operation of the mechanism. Therefore the distance through which the shutter has to move in each operation of the apparatus is only one-half of that through which it would require to move if only one row of compartments were provided.

Figure 6:
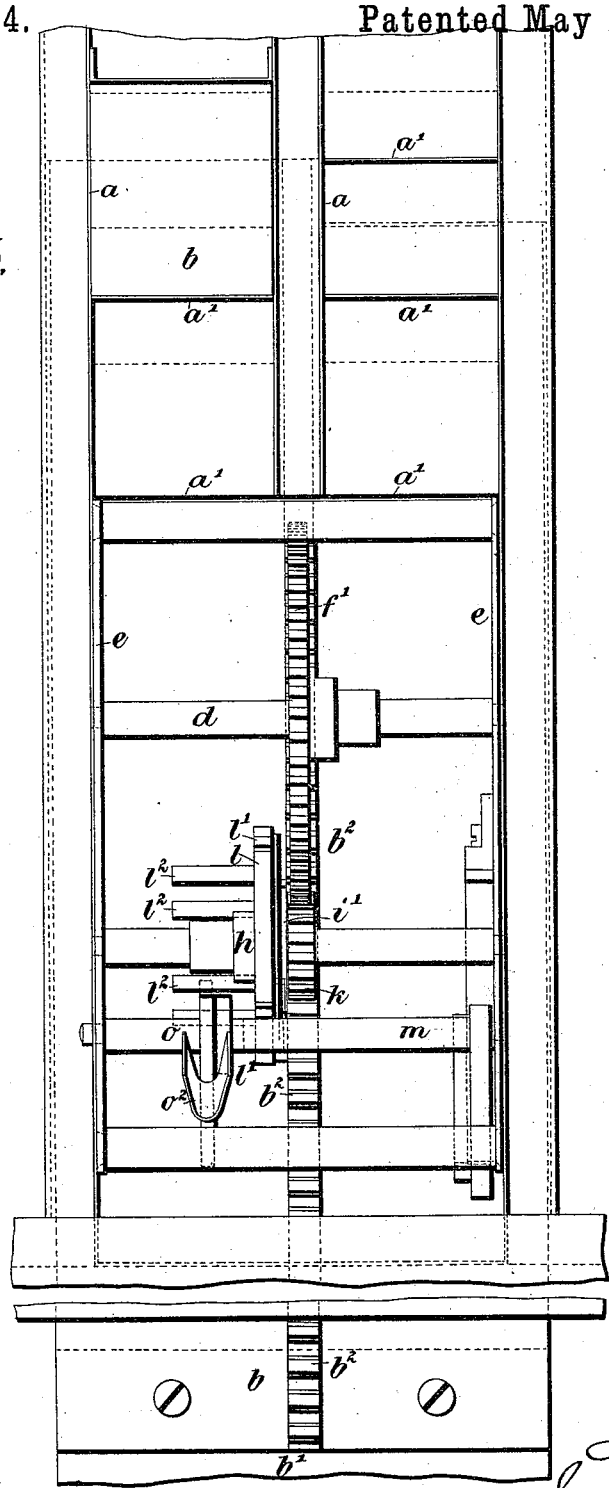
Figure 7:
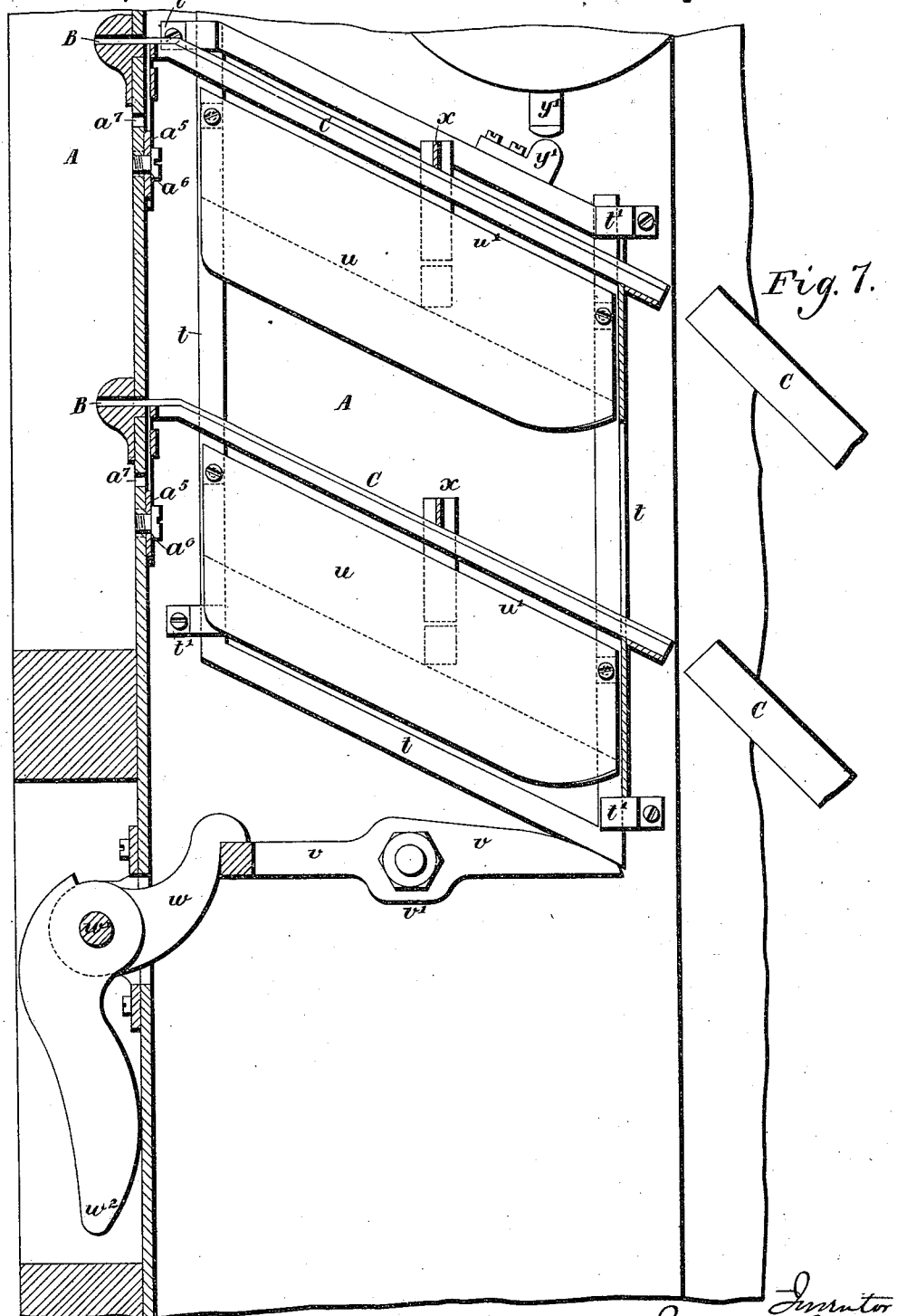

Figs. 4 to 6 illustrate a modification wherein the hoppers $a$ are placed in a vertical position in the box or case A. In this case the partitions $a'$, forming the compartments, are inclined to permit the articles contained in the said compartments to drop therefrom when released by the descent of the shutter $b$. In this arrangement, moreover, the clock-work spring is dispensed with and the said shutter $b$ descends when released by the action of gravity, a weight $b'$, if necessary, being attached to the said shutter. The shutter $b$ is retained in position in front of the compartments of the hopper $a$ by means of a rack $b^2$, with which is geared a toothed wheel $f'$, which is prevented from rotating (except when released by the insertion of a coin) by means of a modified form of the escapement device hereinbefore described, in which the lever or arm $n$ is dispensed with and the lever $o$ is secured to the shaft or spindle $m$ and is provided upon its short arm with a counter-weight $o^3$. The other parts of the said device are substantially similar to those hereinbefore described. $a^3$ is a weight adapted when the articles are delivered from the lowermost compartments to take the place of the article in the compartment from which the last delivery was made, and by means of a cord, wire, or chain $a^4$, Fig. 5, passing over a pulley (not shown) attached to any suitable part of the apparatus, elevate a plate or slide $a^5$, Figs. 7 and 8, pivoted at $a^6$ to the box or case A, and exhibit at a window or aperture $a^7$ the word "Empty" and also close the coin slit or aperture B by means of the projection $a^8$. In some cases I so arrange the plate or slide $a^5$ that it normally exhibits at the said window or aperture the words "In order" until moved in the manner above described. One of these weights is provided for each of the hoppers $a$, and its coin slit or aperture is provided with a pivoted plate or slide arranged to be actuated thereby, as above described.

In my apparatus the compartments of the hopper are at all times inaccessible to the public, and the said compartments are so arranged that as they are opened the articles will fall therefrom into a convenient position for withdrawal from the apparatus by the purchaser.

Figure 8:
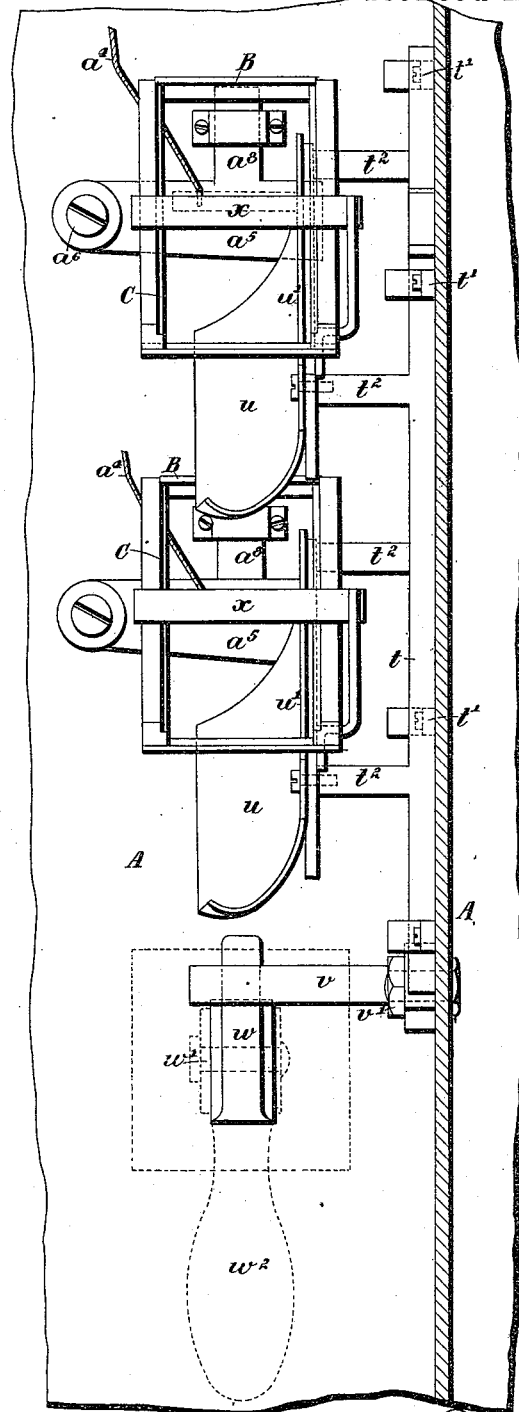

Figs. 7 and 8 illustrate a device for preventing fraud and for clearing the coin-chutes C—that is to say, in the event of the insertion of a coin or coins into any of the said chutes while the latter is stopped or choked up by any foreign body previously inserted therein—such as a piece of card-board, lead, or the like—the said chute may be cleared by means of the said device, and the owner may thus recover the said coin. $t$ is a frame carried in suitable bearings or guides $t'$, which permit of the said frame sliding or moving vertically therein. $u\ u$ are plates or pieces of metal firmly attached in any suitable manner to projections $t^2$ upon the frame $t$, and the upper edges $u'$ of which are adapted to rest under normal conditions on a line, or nearly so, with the grooves provided in the open portions of the chutes C, adapted to receive and support coins or disks of proper dimensions, but to allow those of inferior dimensions to drop or fall through the said open portion of the said chutes C. $v$ is a bent lever pivoted at $v'$ to the box or case A or to any other suitable support. One extremity of the lever $v$ bears against and supports the frame $t$ and the other extremity is connected in any suitable manner to one arm of a bell-crank lever $w$, pivoted at $w'$ to the box or case A, or to a suitable bracket or brackets attached thereto. The other extremity of the said lever $w$ is provided with a handle $w^2$, which can be operated from the exterior of the apparatus. $x\ x$ are checks, also carried by the frame $t$, which normally remain in position just above the hereinbefore-mentioned grooves in the chutes C, adapted to receive coins of the proper dimensions, thus preventing the possibility of a coin or disk of less than the requisite dimensions being caused to jump across the partially-open portions of the chutes C, in which the said grooves are situated, to the closed or vertical portions of the said chutes, and thereby falling down the latter and actuating the mechanism.

When it is desired to clear the coin-chutes C, the handle $w^2$ of the lever $w$ is raised, thus depressing the other arm of the said lever, and consequently the outer arm of the lever $v$ connected therewith. The inner arm of the said lever $v$ is necessarily raised, and with it the frame $t$ and plates or pieces $u$, the edges $u'$ of which clear the chutes C of any obstruction, which will then fall upon the lower curved surfaces of the said plates or pieces $u$, whereby it will be conducted into a convenient position for removal by hand.

Fig. 9 shows an improved switch which I sometimes employ (when more than one coin-chute is used) for causing the delivery of the coins alternately to either of two chutes. $z$ is a receptacle of semicircular form divided into two compartments by a partition $z'$. The said receptacle $z$ is pivoted at $z^2$, so that a coin or coins dropping through the chute C will be delivered alternately to either of the chutes $C^2\ C^3$. This arrangement is advantageous when the apparatus is constructed to be operated by means of two coins.

Figs. 10 to 12 illustrate a device which I sometimes employ to prevent the introduction of disks of lead, card-board, or other soft material through the coin slit or aperture B into the chute C. B′ is a plate which is intended to be fixed to the box or case A, and in which is situated the coin slit or aperture B. E is another plate arranged to move freely in grooves F at the rear of the plate B′ and provided with sloping knife-edges E′, which normally extend at each side of the coin slit or aperture B, so as to partially close the same. Should an attempt be made to insert a disk of lead or other soft material of the same dimensions as the coin by which the apparatus is arranged to be operated into the said coin slit or aperture B, the said knife-edges E′ will cut into the periphery or edge of the said disk and effectually prevent its insertion therein. If, however, a coin of the requisite dimensions which is formed of hard or comparatively hard metal be inserted in the coin slit or aperture B, the said knife-edges will not cut into its periphery or edge, but will slip or slide upon the same, and, owing to the sloping or slanting direction of the said knife-edges, the plate will rise or slide in an upward direction in the grooves F and allow the said coin to pass into the chute C.

The box or case of the apparatus may be formed of wood with brass or other metal pillars and sheets or plates of looking-glass let into the front, and provided with a clock and with windows to exhibit samples of the various articles contained in the apparatus, as shown in Fig. 4 or it may be formed of metal, or of terra-cotta or porcelain, or partly of metal or wood and of terra-cotta or porcelain.

It is obvious that my improved apparatus will deliver any article that will fit into the compartments in the hopper or hoppers without the necessity for altering the said hoppers in any way. Moreover, by increasing the dimensions of the said compartments articles of considerable size may be delivered therefrom.

My improved apparatus for receiving payment and delivering value in exchange therefor is entirely automatic in its action and will deliver a great variety of different articles without any necessity for modifying the apparatus—as, for instance, boxes of matches, packets of sweets, cigars, cigarettes, postcards, photographs, books, pamphlets, newspapers, or any other suitable article that will not be damaged by falling from the compartments to the delivery-aperture, the smallest article being capable of being delivered from the largest sized compartments as well as the larger articles. Moreover, although I have hereinbefore described convenient and advantageous methods of carrying my said invention into practice, it is obvious that I can somewhat further modify the construction of the apparatus without, however, departing from the nature of my said invention. For instance, I can alter the shape of the compartments in the said hoppers, and I can employ any desired number of the said hoppers and construct the same of any convenient length, and I can substitute for the mechanism above described other suitable means for causing the flexible band or shutter to deliver articles alternately from each hopper at each operation of the mechanism and of the said flexible band or shutter. The said flexible band or shutter can be arranged to move any predetermined distance at each operation, and instead of the wheels hereinbefore described a roller can be employed for carrying the said band or shutter. The hoppers (when more than one is used) may contain different articles, thus affording the choice of one or more articles to the intending purchaser.

The apparatus can be so arranged as to be operated by a coin or coins or their equivalents of any predetermined value.

The said apparatus can, moreover, be advantageously employed to give change or deliver coin of less value than that employed to actuate the mechanism with the article delivered. For instance, if it is desired to deliver the articles in the hopper or in one of the hoppers for a half-penny, and the delivery mechanism is arranged to be actuated by the insertion of a penny into the apparatus, I place a half-penny in each of the compartments of the hopper along with the article to be delivered or in a small separate compartment arranged so as to be uncovered by the band or shutter at the same time as the main compartment, the said article and half-penny falling out together when the delivery mechanism is operated by the insertion of a penny into the apparatus.

What I claim is—

1. The combination, with the shutter-moving mechanism, of the gearing $j$ $k$, disk $l$, having projections $l'$, the cut-away spindle $m$, and the coin-operated lever $o$, connected with the spindle, all operating so that the rocking of the lever operates to permit an escapement movement between the cut-away spindle and the disk, substantially as described.

2. The combination, with the disk $l$, having teeth $l'$ and pins $l^2$, and the cut-away spindle $m$, of the curved arm $n^2$, carried by said spindle, whereby as the moving of the spindle releases the disk the disk-arm will fall in the path of the pins on said disk, substantially as described.

3. In a coin-operated device, the combination of a single movable shutter and a double row of compartments, the partitions in one of said rows located centrally with respect to the compartments in the other row, substantially as and for the purpose described.

4. In a coin-operated device, the combination, with the coin-chutes, of a vertically-movable curved plate and a bell-crank lever connected therewith for operating the same, said plate arranged with relation to the coin-chute so that its edge will pass up the center of the chute and dislodge any obstruction therein upon a movement of the lever, substantially as described.

5. In a coin-operated device, the combination, with the coin-chute, of the vertically-movable plate E, sliding in grooves F in the entrance thereof, having sloping knife-edges E', adapted to bite into and retain any soft material, substantially as described.

In testimony whereof I have hereunto signed my name in the presence of two subscribing witnesses.

JOSEPH OWEN.

Witnesses:
W. P. SHELMERDENE,
I. WINKLE,
    *Both of 57 Princess St., Manchester.*